United States Patent
Torres

(10) Patent No.: US 10,502,077 B2
(45) Date of Patent: Dec. 10, 2019

(54) VANE RETAINER

(71) Applicant: United Technologies Corporation, Farmington, CT (US)

(72) Inventor: Edward Torres, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 781 days.

(21) Appl. No.: 15/073,008

(22) Filed: Mar. 17, 2016

(65) Prior Publication Data

US 2017/0268357 A1   Sep. 21, 2017

(51) Int. Cl.
| | | |
|---|---|---|
| *F01D 17/16* | (2006.01) | |
| *F01D 9/04* | (2006.01) | |
| *F04D 29/54* | (2006.01) | |
| *F04D 29/32* | (2006.01) | |
| *F02C 9/20* | (2006.01) | |

(52) U.S. Cl.
CPC ........... *F01D 9/042* (2013.01); *F01D 17/162* (2013.01); *F02C 9/20* (2013.01); *F04D 29/323* (2013.01); *F04D 29/54* (2013.01); *F05D 2220/32* (2013.01); *F05D 2220/3217* (2013.01); *F05D 2240/12* (2013.01); *F05D 2240/14* (2013.01); *F05D 2250/181* (2013.01); *F05D 2250/182* (2013.01); *F05D 2260/31* (2013.01)

(58) Field of Classification Search
CPC ........ F01D 9/042; F01D 17/162; F01D 17/12; F02C 9/20; F04D 29/323; F04D 29/54; F05D 2250/181; F05D 2260/31; F05D 2220/3217; F05D 2240/14; F05D 2220/32; F05D 2240/12; F05D 2250/182
See application file for complete search history.

(56) References Cited

U.S. PATENT DOCUMENTS

| | | |
|---|---|---|
| 3,269,701 A | 8/1966 | Miller et al. |
| 4,245,954 A | 1/1981 | Glenn |

(Continued)

FOREIGN PATENT DOCUMENTS

EP   3093442 A1   11/2016

OTHER PUBLICATIONS

European Search Report Issued in EP Application No. 17161678.2, dated Aug. 17, 2017, 7 Pages.

*Primary Examiner* — Eldon T Brockman
(74) *Attorney, Agent, or Firm* — Cantor Colburn LLP

(57) ABSTRACT

A vane retainer for a gas turbine engine includes a retainer body, an inner surface of the retainer body to engage complimentary threads of a mating component, and a plurality of castellations located at an end of the retainer body for engagement with complementary installation tool features during installation of the vane retainer to the mating component. A gas turbine engine includes a combustor and a plurality of vane assemblies in fluid communication with the combustor. Each vane assembly includes a vane having an airfoil portion and a vane stem extending from the airfoil portion. The vane stem is inserted into a bushing. A vane retainer is engaged with the bushing and includes a retainer body, an inner surface of the retainer body to engage complimentary threads of the bushing, and a plurality of castellations located at an end of the retainer body for engagement with complementary installation tool features.

19 Claims, 4 Drawing Sheets

(56) References Cited

U.S. PATENT DOCUMENTS

| | | | | |
|---|---|---|---|---|
| 4,307,994 | A * | 12/1981 | Brewer | F01D 17/162 415/160 |
| 4,604,030 | A * | 8/1986 | Naudet | F01D 11/001 415/126 |
| 5,328,327 | A * | 7/1994 | Naudet | F01D 17/162 29/889.22 |
| 6,375,509 | B2 * | 4/2002 | Mountford | H01R 13/622 439/321 |
| 6,860,717 | B2 * | 3/2005 | Schipani | F01D 17/162 415/160 |
| 7,104,754 | B2 * | 9/2006 | Willshee | F01D 17/162 415/159 |
| 7,223,066 | B2 * | 5/2007 | Rockley | F01D 17/162 415/160 |
| 9,879,560 | B2 * | 1/2018 | Dibenedetto | F01D 9/042 |
| 2001/0002348 | A1 * | 5/2001 | Mountford | H01R 13/622 439/607.41 |
| 2002/0182064 | A1 * | 12/2002 | Schipani | F01D 9/041 415/166 |
| 2004/0240989 | A1 * | 12/2004 | Willshee | F01D 17/162 415/148 |
| 2004/0240990 | A1 * | 12/2004 | Rockley | F01D 17/162 415/148 |
| 2016/0333726 | A1 * | 11/2016 | Dibenedetto | F01D 9/042 |

\* cited by examiner

US 10,502,077 B2

VANE RETAINER

BACKGROUND

This disclosure relates to gas turbine engines, and more particularly to retention of vanes of gas turbine engines.

Typical gas turbine engines utilize one or more stages of variable vanes, vanes which are rotatable about a vane axis to vary an angle of attack relative to an airstream flowing across the vane, and to vary a turning angle the variable vane applies to the airstream to change an angle of incidence of the airstream on components downstream of the variable vanes, for example, a fan rotor or compressor rotor. Each vane is typically retained at a case surrounding the vane stage, with the vanes rotably secured to allow for rotation of the vanes about the vane axis. Depending on geometry or configuration of an outer surface of the case, installation of conventional vane retention components at the outer surface of the case can be difficult. Often, compromises are made in the configuration of the case outer surface, such as scallops formed into flanges or the like, to allow for necessary clearance for the vane retention components and their associated installation tools to be utilized to retain the vanes as required.

SUMMARY

In one embodiment, a vane retainer for a gas turbine engine includes a retainer body, a threaded inner surface of the retainer body to engage complimentary threads of a mating component, and a plurality of castellations located at a distal end of the retainer body for engagement with complementary installation tool features during installation of the vane retainer to the mating component.

Additionally or alternatively, in this or other embodiments the plurality of castellations are equally spaced about a vane retainer axis.

Additionally or alternatively, in this or other embodiments a castellation height is substantially equal to a castellation width.

Additionally or alternatively, in this or other embodiments a chamfer is located at a top surface of the castellation.

Additionally or alternatively, in this or other embodiments a fillet is located at a castellation base.

Additionally or alternatively, in this or other embodiments the plurality of castellations is eight equally sized castellations.

In another embodiment, a vane assembly for a gas turbine engine includes a vane having an airfoil portion and a vane stem extending from the airfoil portion. The assembly further includes a bushing into which the vane stem is inserted and a vane retainer engaged with the bushing, including a retainer body, a threaded inner surface of the retainer body to engage complimentary threads of the bushing, and a plurality of castellations located at a distal end of the retainer body for engagement with complementary installation tool features during installation of the vane retainer to the bushing.

Additionally or alternatively, in this or other embodiments the plurality of castellations are equally spaced about a vane retainer axis.

Additionally or alternatively, in this or other embodiments a castellation height is substantially equal to a castellation width.

Additionally or alternatively, in this or other embodiments a chamfer is located at a top surface of the castellation.

Additionally or alternatively, in this or other embodiments a fillet is located at a castellation base.

Additionally or alternatively, in this or other embodiments the plurality of castellations is eight equally sized castellations.

Additionally or alternatively, in this or other embodiments the vane stem defines an axis of rotation of the vane.

In yet another embodiment, a gas turbine engine includes a combustor and a plurality of vane assemblies in fluid communication with the combustor. Each vane assembly includes a vane having an airfoil portion and a vane stem extending from the airfoil portion. The vane assembly further includes a bushing into which the vane stem is inserted, and a vane retainer engaged with the bushing, including a retainer body, a threaded inner surface of the retainer body to engage complimentary threads of the bushing, and a plurality of castellations located at a distal end of the retainer body for engagement with complementary installation tool features during installation of the vane retainer to the bushing.

Additionally or alternatively, in this or other embodiments the plurality of castellations are equally spaced about a vane retainer axis.

Additionally or alternatively, in this or other embodiments a castellation height is substantially equal to a castellation width.

Additionally or alternatively, in this or other embodiments a chamfer is located at a top surface of the castellation.

Additionally or alternatively, in this or other embodiments a fillet is located at a castellation base.

Additionally or alternatively, in this or other embodiments the plurality of castellations is eight equally sized castellations.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
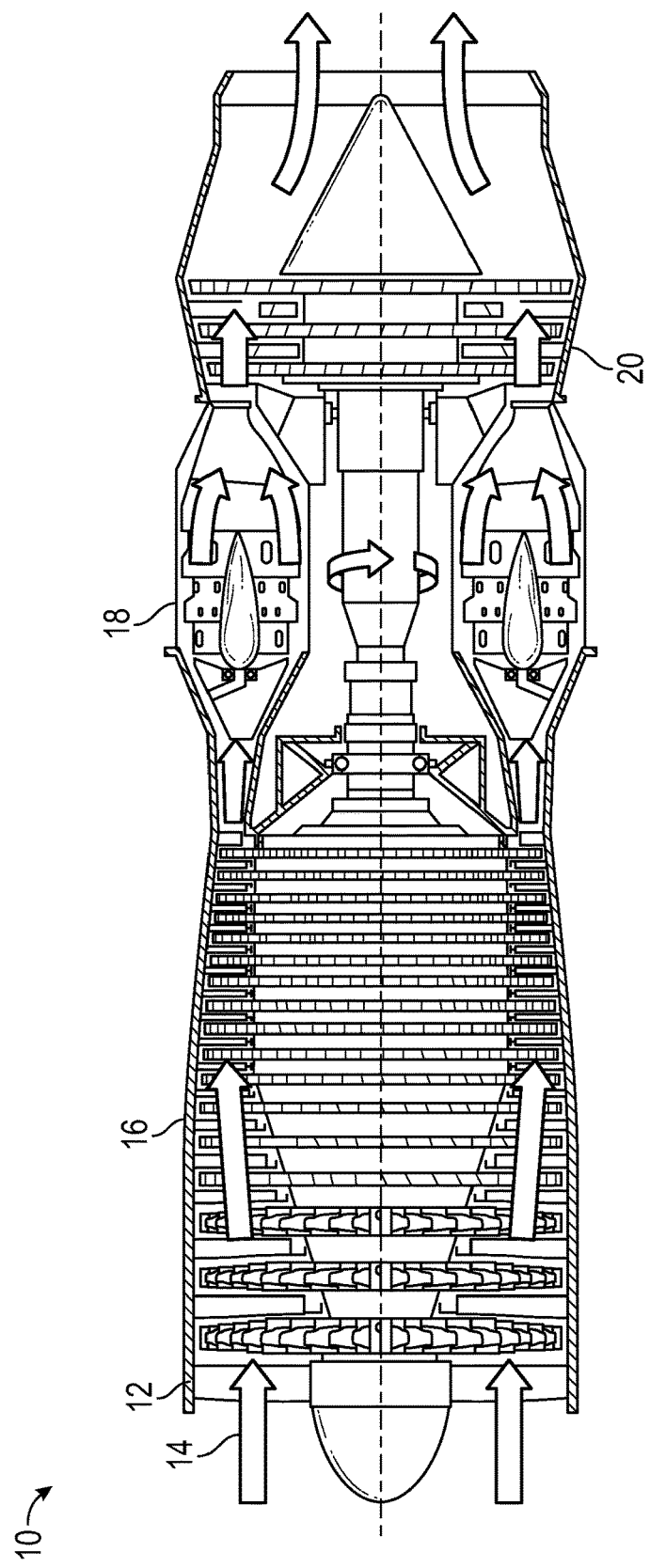
FIG. 1 is a schematic illustration of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10.

The gas turbine engine 10 may further comprise a low pressure compressor located upstream of a high pressure compressor and a high pressure turbine located upstream of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine.

Figure 2:
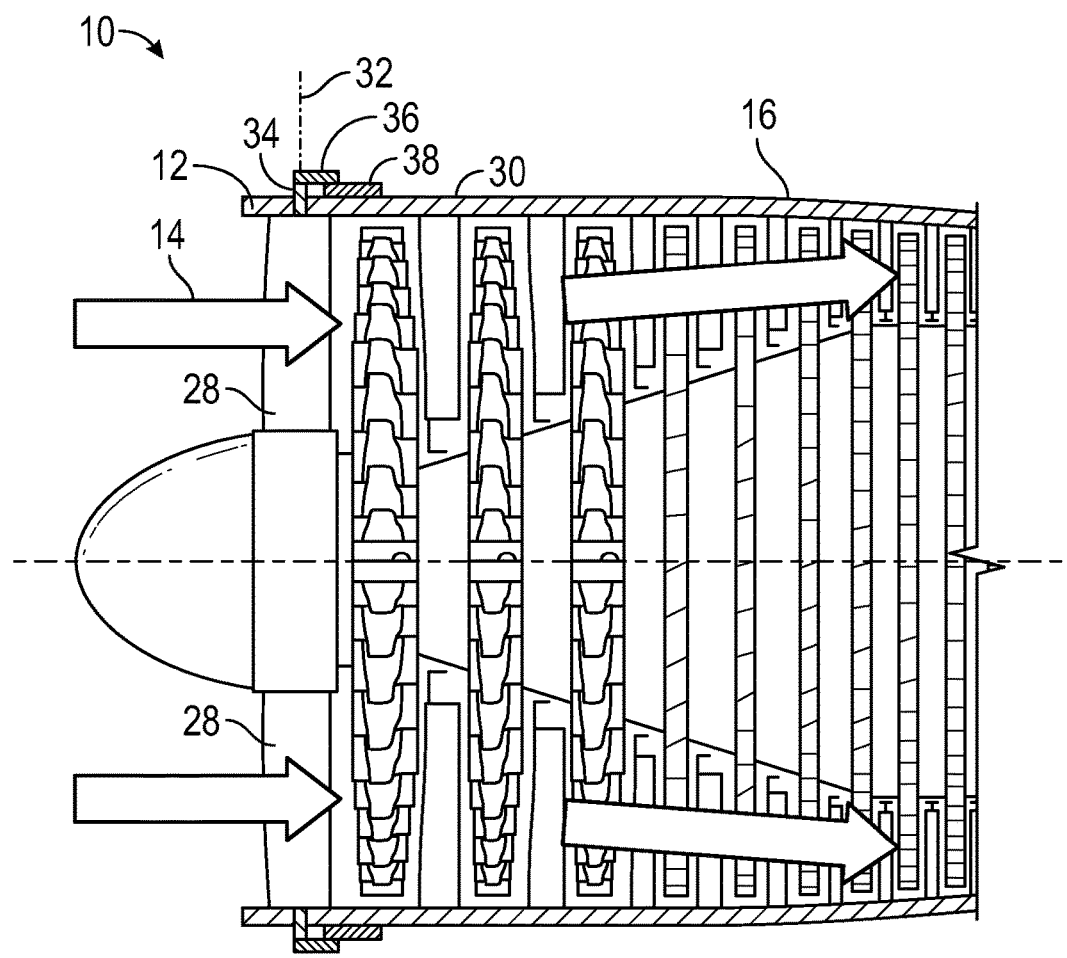
FIG. 2 is a schematic illustration of a variable vane actuation system for a gas turbine engine.

The gas turbine engine 10 may include one or more stages of variable vanes located at, for example, the fan 12 or compressor 16. For example, as shown in FIG. 2, the fan 12 may include a plurality of variable vanes 28. The variable vanes 28 are rotatable secured in a fan case 30, or other case or component, and are each rotatable about a vane axis 32 to vary an angle of incidence of airflow to downstream components, such as fan rotors (not shown). The variable vanes 28 are each connected to a vane arm 34 and a vane linkage 36, which is driven by a vane actuator 38 to urge rotation of the variable vanes 28 about the vane axis 32 to a selected position. While the embodiments described herein relate to variable vanes 28 located at fan case 30, it is to be appreciated that the present disclosure may be readily applied to other vanes of gas turbine engine 10, such as compressor vanes or turbine vanes.

Figure 3:
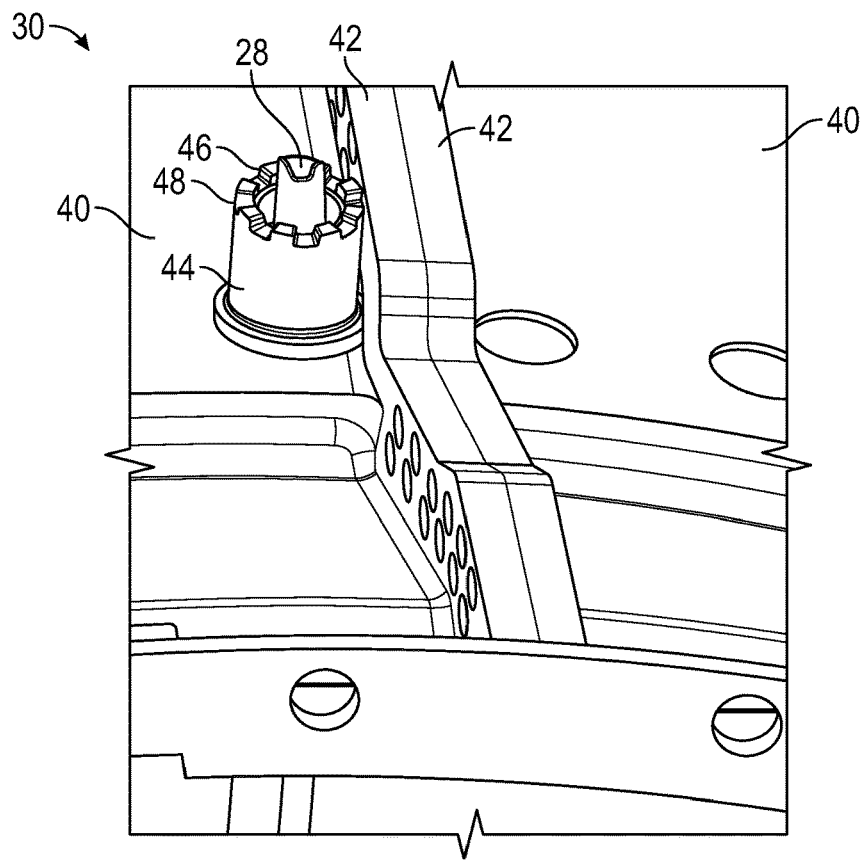
FIG. 3 is a perspective view of an embodiment of a vane retainer.

Referring to FIG. 3, the fan case 30 includes two or more circumferential fan case sections 40 secured to one another to form a full fan case 30. Each fan case section 40 has a case flange 42 which abuts another case flange 42 of an adjacent fan case section 40, with the case flanges 42 secured to one another via, for example, a bolted connection (not shown). Variable vanes 28 are spaced circumferentially around the fan case 30, and in some configurations variable vanes 28 are positioned at locations, such as near case flanges 42, where clearance between the case flange 42 and a vane retainer 44, used to secured the variable vane 28 in place, is small. In a typical case and vane retainer arrangement, the case flange is thinned or even notched to increase clearance for the vane retainer and its associated installation tool. The thinning and/or notching of the fan case flange or other fan case features to accommodate a typical vane retainer arrangement often requires a more robust material be used for the fan case and/or other features added to the fan case so the fan case meets service life requirements.

Figure 4:
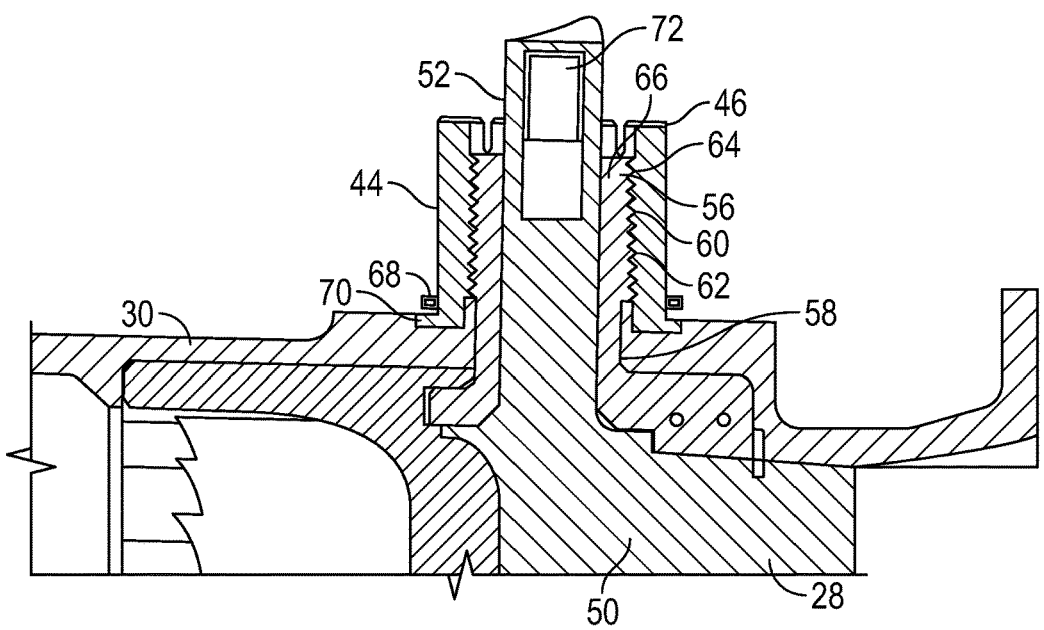
FIG. 4 is a cross-sectional view of an embodiment of a vane retention arrangement.

The vane retainer 44 disclosed herein, however, requires that no such concessions be made. Rather than using features at an outer diameter of the vane retainer as tool engagement surfaces for installation of the vane retainer, vane retainer 44 includes a plurality of castellations 46 located at a retainer end 48 as tool engagement surfaces. Referring to the cross-sectional view of FIG. 4, the variable vane 28 includes an airfoil portion 50 and a vane stem 52 extending radially outwardly from the airfoil portion 50. The vane stem 52 is inserted into a bushing 56, with the bushing 56 inserted into and extending through a vane opening 58 in the fan case 30. The vane stem 52 is positioned in the bushing 56 so that the vane stem 52 is free to rotate relative to the bushing 56. The vane retainer 44 is then installed over the bushing 56 such that retainer threads 60 at an inner retainer surface 62 engage with bushing threads 64 at an outer bushing surface 66 to secure the bushing 56 and the variable vane 28 to the fan case 30. Further, in some embodiments a wedge lock washer 68 may be installed at a retainer base 70 of the vane retainer 44 to prevent loosening of the vane retainer 44 once the vane retainer 44 is installed. A helical coil insert 72 located in the vane stem 52 is utilized for installation of a vane arm 34 at the variable vane 28.

Figure 5:
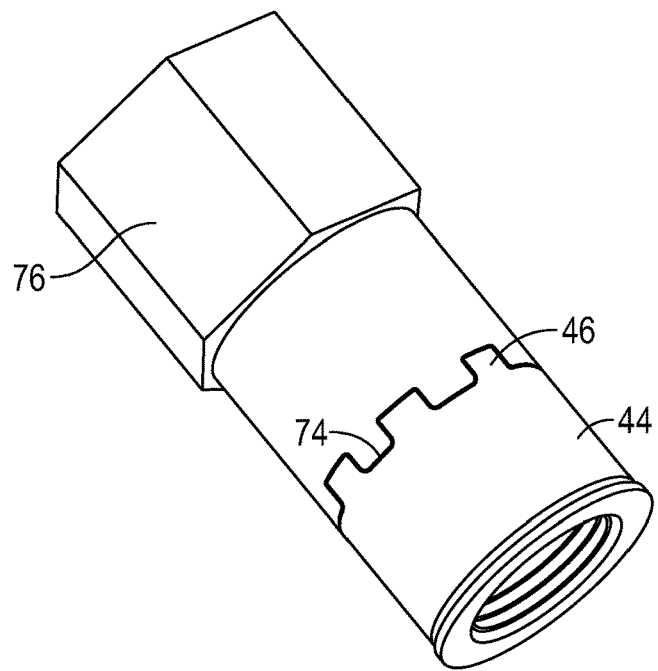
FIG. 5 is a perspective view of an embodiment of a vane retainer and associated installation tool.

As stated above, the plurality of castellations 46 located at the retainer end 48 are utilized as tool engagement surfaces for installation of the vane retainer 44 to the bushing 56. Referring now to FIG. 5, the plurality of castellations 46 engage with a plurality of complimentary tool features 74 of an installation tool 76 to drive rotation of the vane retainer 44 and urge the vane retainer 44 into engagement with the bushing 56.

Figure 6:
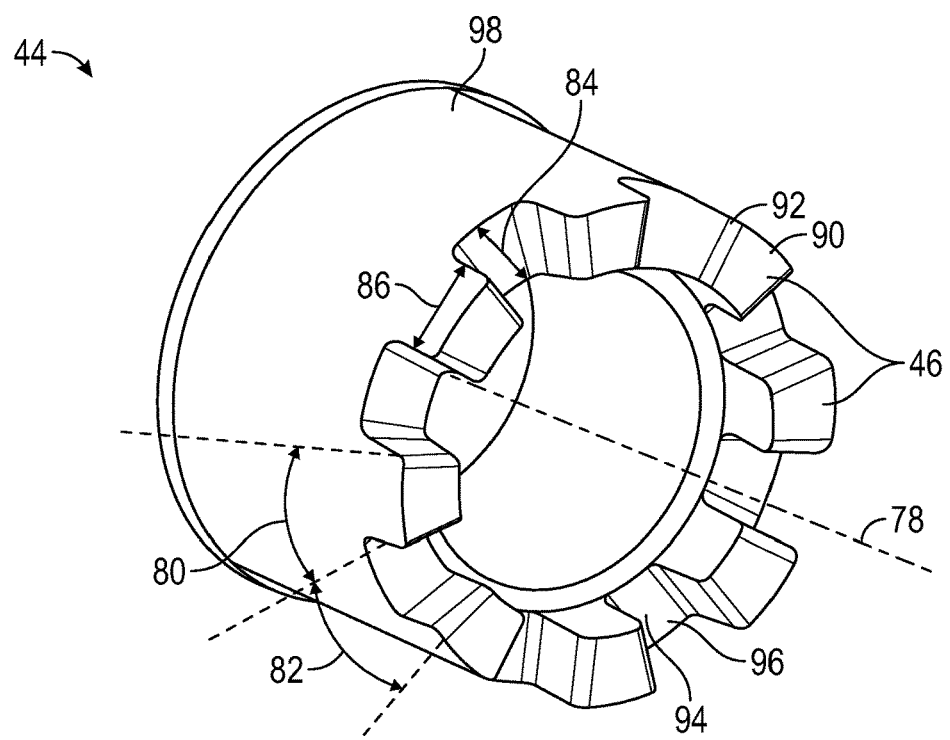
FIG. 6 is another perspective view of an embodiment of a vane retainer.

Referring to FIG. 6, in one embodiment, the vane retainer 44 includes a retainer body 98 and eight equally-sized castellations 46 equally spaced about a vane retainer axis 78. Further, the castellations 46 may be configured and arranged such that a first angle 80 described by each castellation 46 is equal to a second angle 82 between adjacent castellations 46. In the embodiment shown having eight castellations 46, the first angle 80 and the second angle 82 are about 22.5 degrees. While the vane retainer 44 shown in FIG. 6 has eight castellations 46, it is to be appreciated that other numbers of castellations 46 may be utilized in other embodiments, for example, 4, 12, 18 or 24 castellations 46.

In some embodiments, a castellation height 84 may be equal to a castellation width 86, defined at an outer surface of the vane retainer 44. In other embodiments, however, the castellation height 84 may be greater than or less than the castellation width 86. Further, a top portion 90 of each castellation 46 may include a chamfer 92 to facilitate engagement with the tool features 74, and base 94 of each castellation 46 may include a fillet 96 to reduce stresses on the castellation 46 which may lead to castellation 46 breakage.

The vane retainer 44 disclosed herein allows for installation of vanes near to case flanges or other features without the need to modify or eliminate such case features to provide installation tool clearance for installation of the vane retainer. This allows for maintenance of the intended structural or performance integrity of the case without needing to further modify the case or the vane design or arrangement.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A vane retainer for a gas turbine engine comprising:
   a retainer body;
   a threaded inner surface of the retainer body configured to engage complimentary threads of an outer surface of a bushing installed to a casing, the bushing receptive of a vane stem; and a plurality of castellations disposed at a distal end of the retainer body for engagement with complementary installation tool features during installation of the vane retainer to the bushing.

2. The vane retainer of claim 1, wherein the plurality of castellations are equally spaced about a vane retainer axis.

3. The vane retainer of claim 1, wherein a castellation height is substantially equal to a castellation width.

4. The vane retainer of claim 1 further comprising a chamfer disposed at a top surface of the castellation.

5. The vane retainer of claim 1, further comprising a fillet disposed at a castellation base.

6. The vane retainer of claim 1, wherein the plurality of castellations is eight equally sized castellations.

7. A vane assembly for a gas turbine engine, comprising:
a vane having:
an airfoil portion; and
a vane stem extending from the airfoil portion;
a bushing into which the vane stem is inserted, a vane stem outer surface abutting a bushing inner surface; and
a vane retainer engaged with the bushing at a bushing outer surface, including:
a retainer body;
a threaded inner surface of the retainer body to engage complimentary threads of the bushing; and
a plurality of castellations disposed at a distal end of the retainer body for engagement with complementary installation tool features during installation of the vane retainer to the bushing.

8. The vane assembly of claim 7, wherein the plurality of castellations are equally spaced about a vane retainer axis.

9. The vane assembly of claim 7, wherein a castellation height is substantially equal to a castellation width.

10. The vane assembly of claim 7, further comprising a chamfer disposed at a top surface of the castellation.

11. The vane assembly of claim 7, further comprising a fillet disposed at a castellation base.

12. The vane assembly of claim 7, wherein the plurality of castellations is eight equally sized castellations.

13. The vane assembly of claim 7, wherein the vane stem defines an axis of rotation of the vane.

14. A gas turbine engine, comprising:
a combustor; and
a plurality of vane assemblies in fluid communication with the combustor, each vane assembly including:
a vane having:
an airfoil portion; and
a vane stem extending from the airfoil portion;
a bushing into which the vane stem is inserted, a vane stem outer surface abutting a bushing inner surface; and
a vane retainer engaged with the bushing at a bushing outer surface, including:
a retainer body;
a threaded inner surface of the retainer body to engage complimentary threads of the bushing; and
a plurality of castellations disposed at a distal end of the retainer body for engagement with complementary installation tool features during installation of the vane retainer to the bushing.

15. The gas turbine engine of claim 14, wherein the plurality of castellations are equally spaced about a vane retainer axis.

16. The gas turbine engine of claim 14, wherein a castellation height is substantially equal to a castellation width.

17. The gas turbine engine of claim 14, further comprising a chamfer disposed at a top surface of the castellation.

18. The gas turbine engine of claim 14, further comprising a fillet disposed at a castellation base.

19. The gas turbine engine of claim 14, wherein the plurality of castellations is eight equally sized castellations.

* * * * *